United States Patent [19]

Smith

[11] Patent Number: 4,557,526
[45] Date of Patent: Dec. 10, 1985

[54] WATERPROOF AXLE SYSTEM FOR A BOAT TRAILER

[76] Inventor: George O. Smith, 117 Bradley St., Carrollton, Ga. 30117

[21] Appl. No.: 628,439

[22] Filed: Jul. 6, 1984

[51] Int. Cl.$^4$ ............................ B60B 35/04; B60B 35/08
[52] U.S. Cl. ................................. 301/124 R; 301/126; 280/414.1
[58] Field of Search .............. 180/88, 905; 280/414.1; 301/105 R, 108 R, 124 R, 123, 125–127, 108 S; 277/3

[56] References Cited

U.S. PATENT DOCUMENTS

| | | | |
|---|---|---|---|
| 3,226,162 | 12/1965 | Eberle | 301/108 R |
| 3,330,563 | 7/1967 | De Puydt et al. | 301/105 R |
| 3,585,582 | 6/1971 | Dove | 280/414.1 X |
| 4,190,133 | 2/1980 | Ploeger | 301/108 R X |
| 4,489,988 | 12/1984 | Robbins | 301/108 S |

Primary Examiner—David A. Scherbel

[57] ABSTRACT

A system is disclosed for a boat trailer which prevents water from entering the trailer's axle housing when the axle housing is submerged in water during loading or unloading of a boat from the trailer. The system includes a quantity of lubricating oil maintained in the axle housing by seals interposed between the trailers wheel axle and the axle housing and an elongated, hollow tubular member having one end in communication with said lubricating oil and the other end vented to the atmosphere when the axle housing is submerged.

3 Claims, 3 Drawing Figures

U.S. Patent Dec. 10, 1985 4,557,526
FIG. 1
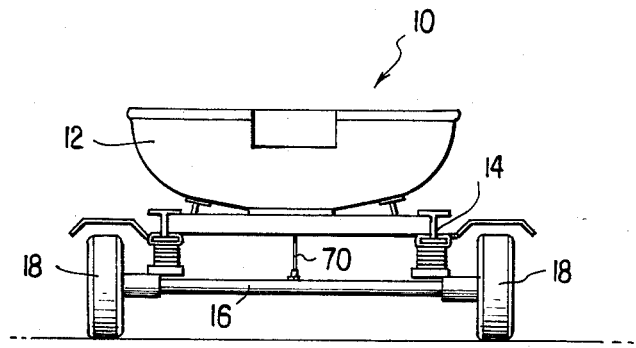
FIG. 2
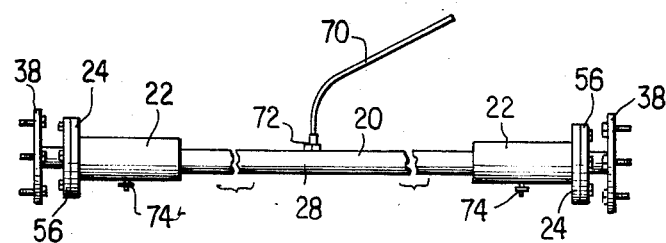
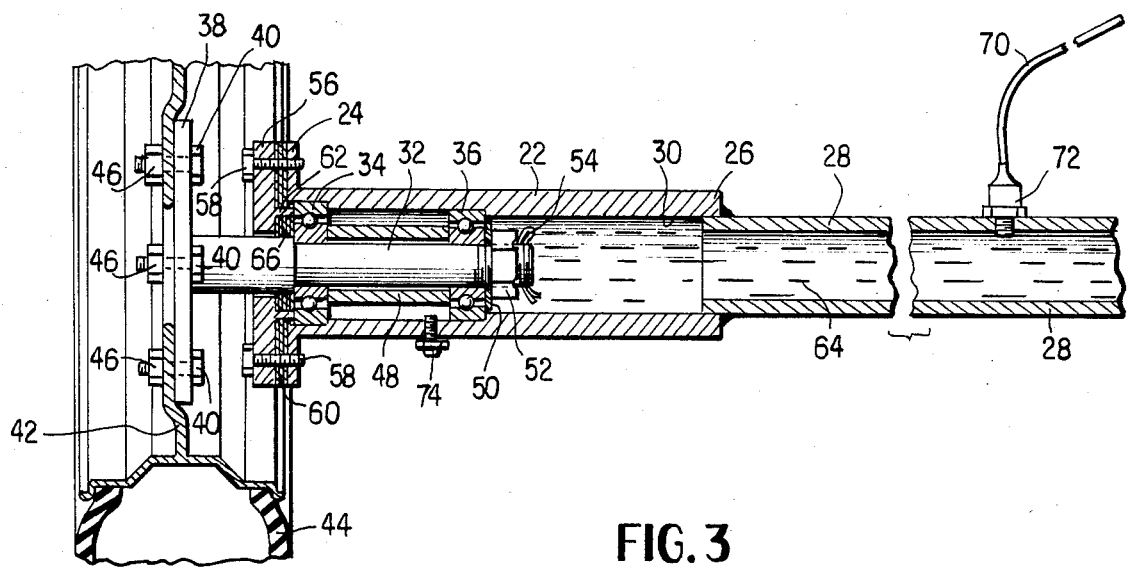
FIG. 3

4,557,526

WATERPROOF AXLE SYSTEM FOR A BOAT TRAILER

BACKGROUND OF THE INVENTION AND OBJECTS

This invention relates to boat trailers and more specifically to a system for preventing water from entering the wheel axle housing of the trailer when it is submerged in the water during loading or unloading of a boat from the trailer.

Attempts to design systems for preventing water from entering and destroying axle bearings when a boat trailer's axle housing is submerged in water are numerous in the prior art. These include means to pressurize the inside of the axle hub with air from the trailer's tires to prevent water from entering the area adjacent the axle bearings such as disclosed in U.S. Pat. No. 3,226,162. Other devices apply positive pressure to the lubricant packing the hub of a bearing by springs and the like to prevent water from entering and damaging the bearings of a boat trailer hub as shown in U.S. Pat. No. 4,190,133.

These devices are attached to the outside end of the hub and perform somewhat satisfactorily; however, due to the complexity of their construction, maintaining sealing of the lubricant under pressure is difficult and maintenance is costly.

In contrast to the aforedescribed devices of the prior art as well as others, the subject invention solves the problem of preventing water from entering the axle housing and destroying the bearings by a simple and inexpensive means. Applicant has discovered that by connecting the bearings by an interconnecting tube, filling the tube with lubricating fluid and venting the inside of the tube to the atmosphere by means of a tubular member which extends a distance above the water level when the wheel hub is submerged prevents water from entering the housing and destroying the bearing.

It is therefore the primary object of this invention to provide a superior means for the purpose of preventing water from entering a boat trailer axle housing when the housing is temporarily submerged thereby protecting the axle bearings from corrosion and damage.

It is another object of the invention to provide a means for accomplishing the aforedescribed purpose which does not require attachment to the outside of the axle housing.

It is yet another object of the invention to provide a means for accomplishing the aforedescribed purpose which is extremely simple in construction and efficient in use.

It is a further object of the invention to provide a means for accomplishing the aforedescribed purpose which is economical to manufacture, capable of long operating life and inexpensive to maintain.

Other objects and advantages of this invention will become apparent from the following description taken in connection with the accompanying drawings wherein are set forth, by way of illustration and example, certain embodiments of this invention.

BRIEF DESCRIPTION OF DRAWINGS

FIG. 1 is a perspective view of a boat trailer utilizing the novel axle system of the present invention;

FIG. 2 is an elevational view of the axle housing, vent tube and wheel mounting flanges of the subject axle system; and FIG. 3 is an enlarged view in partial cross-section of one side of the axle system of the present invention.

DETAILED DESCRIPTION OF PREFERRED EMBODIMENT

Referring now to the drawings where like characters of reference indicate like elements in each of the several figures, numeral 10 refers generally to a boat 12 and conventional trailer 14 for transporting it. The trailer 14 employs the novel watertight axle system 16 of the present invention which is supported by wheels 18.

Referring specifically to FIGS. 2 and 3, the axle system 16 includes an axle housing 20 which has enlarged wheel hub member 22 with a flange 24 integrally formed at the outer end of each hub member and interconnected at the inner ends 26 by means of an elongated hollow tubular member 28. The hub members 22 have an inner surface 30 that support the stub-axle 32 by means of ball-bearings 34, 36 in a conventional manner. The stub-axle 32 is integrally formed with the flange 38 carrying studs 40 for securing the wheel 42 and mounted tire 44 by means of nuts 46. The bearings 34, 36 are mounted on the stub-axle 32 and maintained in spaced-apart relationship by means of spacer 48. The bearings 34, 36 and spacer 48 are held on the stub-axle 32 by means of washer 50 and nut 52 which is locked by a pin 54. The bearings 34, 36 engage the inner surface 30 of the hub member 22 and are held within the hub member 22 with the stub-axle 32 by means of hub cover plate 56 which is secured to the flange 24 by means of bolts 58. A seal 60 is interposed between the cover plate 56 and flange 24 to prevent water from entering therebetween. The cover plate 56 also has a circular-shaped projection 62 which engages bearing 34 to prevent any axial movement of the stub-axle 32 within the hub member 22. The interior of the hub members 22 and interconnecting tubular member 28 is maintained substantially full of lubricating oil 64. To initially seal the hub member 22 and tubular member 28 from the entrance of contaminants or the exit of lubricating oil during normal, over the road operation, circular seals 66 are located on the stub axle 32 and are compressed against the stub axle 32 and bearing 34 when the cover plate 56 is drawn toward the flange 24 by means of the bolts 58.

Applicants have discovered that a hollow vent tube 70 as will be hereinafter described will prevent water from entering the hub member 22 and tubular member 28 where it can cause damage to the bearings 34, 36 whenever the hub and tubular members 22, 28 are submerged in water during on or off loading of the boat 12. More specifically, the hollow vent tube 70 is of a sufficient length to have one end extend to the atmosphere above any anticipated depth of water that may be encountered during such loading or unloading operations and have the other end attached to and in communication with the interior of the hub and tubular members 22, 28 by means of a suitable fitting 72. By so venting the interior of the hub and tubular members 22, 28 to the atmosphere, the water in which the members are submerged is prevented from leaking past the seals 66. A valve 74 is provided on the underside of each hub member 22 for draining the lubricating oil 64 from the interior thereof when changing is required.

It is to be understood that while I have illustrated and described a certain form of my invention it is not to be limited to the specific form or arrangement of parts herein described and shown.

What is claimed is:

1. A waterproof axle system for boat trailers having a frame for supporting a boat comprising:
   (a) an elongated tubular axle housing means adapted to be attached to said frame and containing a quantity of lubricating oil,
   (b) stub axle means having means for rotatably mounting said stub axle in each end of said axle housing, each of said stub axle means having flange means for attachment to a vehicle tire,
   (c) seal means interposed between said stub axle means and said rotatable mounting means, and
   (d) means intermediate said ends of said axle housing means in communication with said lubricating oil for preventing water from passing said seal means into said axle housing means when said axle housing means is submerged in said water.

2. A system as set forth in claim 1 wherein said preventing means is an elongated, hollow, tubular member having one end thereof attached to said axle housing means in communication with said lubricating oil and the other end thereof vented to the atmosphere when said axle housing means is submerged in said water.

3. A system as set forth in claim 1 further comprising means through said axle housing means for draining fluid therefrom.

* * * * *